(12) United States Patent
Joulin et al.

(10) Patent No.: US 6,582,796 B1
(45) Date of Patent: Jun. 24, 2003

(54) MONOLITHIC HONEYCOMB STRUCTURE MADE OF POROUS CERAMIC AND USE AS A PARTICLE FILTER

(75) Inventors: Jean Pierre Joulin, Grabels (FR); Fabienne Pourchet, Salindres (FR); Philippe Courty, Villejuif (FR); Jean-Baptiste Dementhon, Paris (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 118 days.

(21) Appl. No.: 09/621,345

(22) Filed: Jul. 21, 2000

(30) Foreign Application Priority Data

Jul. 21, 1999 (FR) .............................. 99 09432

(51) Int. Cl.$^7$ ................................. B32B 3/12
(52) U.S. Cl. ................. 428/116; 428/174; 428/188; 428/325; 428/332; 264/630; 264/631
(58) Field of Search ................. 428/116, 174, 428/188, 325, 332; 264/630, 631

(56) References Cited

U.S. PATENT DOCUMENTS

| | | | | |
|---|---|---|---|---|
| 4,364,760 A | * | 12/1982 | Higuchi et al. | 55/523 |
| 4,824,711 A | * | 4/1989 | Cagliostro et al. | 428/116 |
| 5,733,352 A | * | 3/1998 | Ogawa et al. | 55/523 |
| 5,914,187 A | * | 6/1999 | Naruse et al. | 428/327 |

OTHER PUBLICATIONS

Chemical Abstracts, vol. 118, No. 18, May 3, 1993, Columbus, Ohio, U.S. Abstract No. 174403d.

* cited by examiner

Primary Examiner—Deborah Jones
Assistant Examiner—Ling Xu
(74) Attorney, Agent, or Firm—Millen, White, Zelano & Branigan, P.C.

(57) ABSTRACT

A monolithic honeycomb-type structure useful in particular as a particle filter for exhaust gases from diesel engines has a number of passages that empty into the end faces of said monolith, but are alternately open and sealed. The monolith consists of a porous refractory material that comprises: 70 to 97% by mass of $\alpha$ and/or $\beta$ crystallographic-type silicon carbide that has at least one particle size and preferably at least two particle sizes, and 3 to 30% by mass of at least one bonding ceramic phase in the form of a micronic powder or particles that are obtained by atomization, comprising at least one simple oxide, for example, $B_2O_3$, $Al_2O_3$, $SiO_2$, MgO, $K_2O$, $Li_2O$, $Na_2O$, CaO, BaO, TiO, $ZrO_2$ and $Fe_2O_3$ and/or at least one mixed oxide, for example, the alkaline aluminosilicates (of Li, Na, or K) or alkaline-earth aluminosilicates (of Mg, Ca, Sr or Ba), clays, bentonite, feldspars or other natural silico-aluminous materials. The production of the monolith comprises a calcination stage under an oxygen-containing atmosphere at a temperature up to 1650° C., but less than 1550° C.

31 Claims, No Drawings

MONOLITHIC HONEYCOMB STRUCTURE MADE OF POROUS CERAMIC AND USE AS A PARTICLE FILTER

The invention relates to new monolithic structures with parallel passages that are plugged alternately on one end face or the other of said monolithic structures that can be used in particular as particle filters for the exhaust gases of diesel engines. The invention also relates to the production of such structures.

PRIOR ART

The exhaust gases of internal combustion engines and in particular those of diesel engines contain soots or particles that pollute the atmosphere and can be very injurious to health. Various methods have been considered for attempting to solve this problem. It is proposed in particular to collect these particles in filters that consist of porous materials that are placed in the exhaust line of the engine.

Filters that consist of honeycomb-type monoliths made of refractory materials, such as cordierite or silicon carbide, were already described in the prior art.

These monoliths comprise a number of passages that are separated by porous walls, whereby said passages are alternately plugged at one end or the other to force the gas flow to diffuse through said walls.

The monoliths of this type that are produced from cordierite have the drawback of exhibiting premature aging caused by poor heat dissipation during the combustion of the soots that are retained, combined with a weak mechanical resistance.

With regard to silicon carbide monoliths already described previously, their production is difficult.

Actually, a standard technique consists in using as a starting material two silicon carbide powders of different grain sizes that are mixed, extruded, dried and brought to a very high temperature, on the order of 2100–2500° C., in general under an inert atmosphere; under these conditions, an abnormal growth of the largest crystals is observed, and the finest crystals undergo evaporation-condensation, which finally causes undesirable modifications of the properties of the monolith that is thus produced.

More recently, a production process was proposed that is carried out starting from silicon powder and carbon or an organic material that, by thermal decomposition, will provide the carbon that is necessary for combining with silicon. The production according to such a method also requires a final calcination stage at a high temperature, generally greater than 1650° C. and most often ranging up to 2100–2400° C., under an inert atmosphere.

DESCRIPTION OF THE INVENTION

The Monoliths

The invention proposes a new monolith that can be used as a particle filter for the exhaust gases of the diesel engines, whereby this monolith has the advantage of being able to be produced by a process in which the calcination stage calls for using neither a temperature of more than 1650° C. nor an inert atmosphere.

The monolith according to the invention can be defined in that it consists of a solid that consists of a porous refractory material whose outside volume is delimited by a cylindrical surface (in the horizontal direction) whose generatrix rests on the two end faces of any shape, for example square, rectangular, polygonal, circular or elliptical. A number of passages that are parallel to one another and to the generatrix and that empty into the end faces of said monolith pass through the solid, whereby these passages can have a square, rectangular or triangular or else polygonal section.

The monolith of the invention basically consists of a material that comprises 70 to 97% by mass, preferably 82 to 90% by mass, of α and/or β crystallographic-type silicon carbide that has at least one particle size and preferably at least two particle sizes;

and 3 to 30% by mass, preferably 18 to 15% by mass, of at least one bonding ceramic phase in the form of a micronic powder and/or particles that are obtained by atomization, comprising at least one simple oxide that is selected from among, for example, $B_2O_3$, $Al_2O_3$, $SiO_2$, $MgO$, $K_2O$, $Li_2O$, $Na_2O$, $CaO$, $BaO$, $TiO_2$, $ZrO_2$ and $Fe_2O_3$ and/or at least one mixed oxide that is selected from among, for example, the alkaline aluminosilicates (of Li, Na or K) or alkaline-earth aluminosilicates (of Mg, Ca, Sr or Ba), clays, bentonite, feldspars or other natural silico-aluminous materials.

The material that constitutes the monolith—i.e., the walls that separate the passages—in general has a porosity of 35 to 65%, preferably 40 to 60%.

The distribution of pores is essentially monopopulated and can be centered between, for example, 5 and 60 micrometers, preferably 10 to 40 micrometers, and even more preferably 15 to 35 micrometers.

Actually, the size of the pores depends essentially on the size of the particles of silicon carbide and that of the grains of the ceramic binder that is used, as will be described latter, in particular in connection with the procedure for production of the monoliths of the invention.

The silicon carbide that has the primary portion of the material that constitutes the monoliths of the invention preferably has several particle sizes, for example from two to five particle sizes. Thus, it is possible to use designated silicon carbides, according to the FEPA 42 F 1984 standard by the symbols of F 100 to F 1200, which corresponds to particles of a mean size of 3 to 125 micrometers. In the case of a silicon carbide with two particle sizes, it is possible to consider, for example, the presence of a major proportion (for example on the order of 90% by mass) of silicon carbide in the form of particles of 15 to 125 micrometers and a minor proportion (for example on the order of 10% by mass) of silicon carbide in the form of particles that have a mean size that is less than 15 micrometers.

The bonding ceramic phase that is present in the material that constitutes monolithic structures of the invention preferably has an overall composition that is adjusted to exhibit an expansion coefficient that is close to the one of silicon carbide, nearly 50%, preferably nearly 30% and even more preferably nearly 25%.

In general, the passages that traverse the monolith are, at each end, alternately open or closed, such that for each open passage at one end, the adjacent passages are closed, whereby the gas flow that penetrates the monolith is then forced to diffuse through the porous walls that separate the passages. For example, for the square-section passages, the end faces of the monolith have the appearance of a checkerboard.

The monolith can have a number of cells (or passages) of about 50 to 400, more particularly about 100 to 200 per square inch (or about 7.75 to 62 per $cm^2$, more particularly about 15.5 to 31 per $cm^2$). The passages have approximately a cross section of about 0.5 to 9 $mm^2$, more particularly 1.5 to 4 $mm^2$, taking into account a thickness of the walls that separate the passages of about 0.3 to 1.5 mm, more particularly 0.5 to 0.8 mm.

The monoliths of the invention have exceptional properties of mechanical resistance and thermal shock resistance.

Production of the Monolith

The monolith of the invention can be produced by any suitable operating procedure that comprises in particular a stage of mixing the components resulting in a homogeneous product in the form of a thickened paste, an extrusion stage of said product through a suitable die to form the honeycomb-type monolith, a stage for drying the monolith that is obtained, then a calcination stage, whose advantage, according to the invention, is that it is carried out at a temperature that does not exceed 1650° C., preferably less than 1550° C., and under an atmosphere that contains oxygen. The operation that aims at plugging every other passage at each end of the monolith can be carried out at any stage of the production, either on the crude monolith, just after the extrusion, or on the dried monolith, or on the monolith that underwent a calcination stage.

A particular operating procedure is described in more detail below.

In the first stage, the silicon carbide with a suitable particle size, the bonding phase that consists of at least one simple oxide and/or at least one mixed oxide as defined above, and in general a pore-forming agent, are mixed in a dry mill, then at least one organic plasticizer, selected from, for example, the alkyl celluloses (methyl, ethyl or carboxymethyl cellulose), polyacrylic alcohol, stearic acid, bio-polymers, polyvinyl alcohol, various gums (xanthan, arabic or tragacanth) and water are added.

The pore-forming agents that can be used are, for example, starch, cellulose, carbon black, sawdust, polystyrene, ammonium nitrate, glucose, polyethylene glycols or any organic or inorganic material in the form of a calibrated powder that can decompose into volatile products during the calcination of the material.

To produce the desired porosity for the material that constitutes the monolithic structure of the invention, a group of silicon carbides that have varied particle sizes, for example, one or more silicon carbides that have relatively large particles (in the range of sizes of 15 to 125 micrometers) and one or more silicon carbides that have relatively fine particles (of sizes less than 15 micrometers), whose diameter has an influence over the diameter of the pores, is generally used by making an addition of a proportion of about 5 to 30% by mass of at least one pore-forming agent, selected based on the desired size of the pores.

It is also possible to add at least one deflocculant agent to the mixture. It is mixed until a homogeneous paste is obtained.

The homogeneous product can advantageously be cured (aged) for example at ambient temperature and under controlled hygrometry (to prevent the evaporation of the water), for example for 24 hours.

In the extrusion stage, the paste is extruded, for example, under vacuum (typically under 15 to 20 mm of mercury) in a screw (single-screw or double-screw) extruder or piston extruder to obtain crude ceramic slabs in the form of honeycomb monoliths.

These crude ceramic slabs are then dried to a temperature from, for example, ambient temperature to 110° C., under a controlled-hygrometry atmosphere, for an adequate time to bring their content of water that is not bonded chemically (free water) to less than 1% by mass, whereby the drying lasts for example for about twenty hours.

Any method that is known to one skilled in the art that makes it possible to meet this objective under optimum technico-economic conditions is implicitly part of the production process of the invention.

The calcination of the monolithic structure is carried out under an atmosphere that contains oxygen, in general under air, by gradually raising the temperature, for example from 10 to 50° C./hour, by keeping it at a temperature of 1100 to 1650° C., for example 1300 to 1650° C., preferably 1350 to 1550° C., for at least one hour, preferably at least two hours, then it is cooled to ambient temperature.

The plugging of every other passage on each of the end faces of the monolith is carried out by application of ceramic compositions that are known to one skilled in the art. Their composition is in general as close as possible to the composition that constitutes the monolith itself, but it is adjusted to exhibit a contraction upon firing that is smaller than that of the material that constitutes the monolith and to ensure the sealing of passages that are thus plugged after the firing, regardless of the conditions of the rise or fall of temperature to which the monolith can be subjected during its use.

The monolithic structures of the invention in general consist of elementary monoliths that are assembled by ceramic bonding according to any technique that is known to one skilled in the art to constitute the particle filter that has the desired geometry to be able to be installed in the exhaust line of the diesel engine.

The following example is intended to illustrate the invention. It should in no way be considered as limiting.

EXAMPLE

Introduced into a mixer are:

85 g of silicon carbide with a particle size F100 (having a mean size of 125 micrometers), 10 g of a mixture of 50 parts of alumina $Al_2O_3$, 30 parts of zirconium $ZrO_2$, 20 parts of silica $SiO_2$, 5 g of clay, 5 g of a cellulose plasticizer, 12 g of calibrated sawdust with particle size of 2 to 100 micrometers and water.

It is dry-mixed for 5 minutes, the water is added for 5 minutes, and the mixing is continued for 15 more minutes, thus forming a homogeneous paste that has a suitable plasticity (determined by measuring an extrusion force on a monitoring device).

The paste is mixed for 24 hours under controlled hygrometry, then extruded through a die in the form of a honeycomb monolith of a length of 20 cm and with a square section of 2.54 cm on a side, having 196 passages (14×14), whereby the thickness of the walls between the passages is 0.5 mm.

The monolith is dried at controlled temperature and hygrometry, ranging up to a maximum of 110° C., whereby the drying cycle lasts for 20 hours.

For the alternate plugging of passages on each end face of the monolith, the passages that should not be plugged by a cover are masked, and a paste of the same composition as the paste that was used to form the monolith but without a pore-forming agent is applied to each of the faces by making said paste penetrate into the passages to be plugged at a depth of 1 cm.

The firing of the monolith is carried out by gradual heating (increase of 20° C./hour) under air to a temperature of 1480° C. that is maintained for 5 hours. It is allowed to cool.

A honeycomb monolith that has a porosity of 51%, a density of 1.55 and a very satisfactory compression resistance is finally obtained.

The distribution of the pores is essentially monopopulated and centered on 40 $\mu$m.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 99/09.432, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A monolithic honeycomb-type structure made of porous ceramic, whose outside shape is delimited by a cylindrical surface that rests on two end faces of any shape, whereby said structure comprises a number of parallel passages that are separated from one another by porous walls, said porous ceramic comprising:
   70 to 97% by mass of α and/or β crystallographic-type silicon carbide that has at least one particle size; and
   3 to 30% by mass of at least one bonding ceramic phase in the form of a micronic powder and/or particles that are obtained by atomization, comprising at least one of (A) at least one simple oxide selected from the group consisting of, $B_2O_3$, $Al_2O_3$, $SiO_2$, MgO, $K_2O$, $Li_2O$, $Na_2O$, CaO, BaO, $TiO_2$, $ZrO_2$ and $Fe_2O_3$ and (B) at least one mixed oxide selected from the group consisting of, alkaline aluminosilicates, alkaline-earth aluminosilicates, clays, bentonite, and feldspars.

2. A monolithic structure according to claim 1, wherein the constituent ceramic material has a porosity of 35 to 65% and a substantially monopopulated pore distribution of between 5 and 60 micrometers centered on a single pore size.

3. A monolithic structure according to claim 1, wherein the silicon carbide has a particle size that corresponds to particles of a mean size of about 3 to about 125 micrometers.

4. A monolithic structure according to claim 1, wherein the silicon carbide has at least two particle sizes.

5. A monolithic structure according to claim 4, wherein the silicon carbide has two to five particle sizes.

6. A monolithic structure according to claim 4, wherein a major proportion of silicon carbide is in the form of particles of 15 to 125 micrometers and a minor proportion of silicon carbide is in the form of particles that have a mean size that is less than 15 micrometers.

7. A monolithic structure according to claim 1, wherein the bonding ceramic phase has an overall composition that exhibits a coefficient of thermal expansion that is close to that of silicon carbide by a difference of not more than about 50%.

8. A monolithic structure according to claim 1, wherein one of said end faces comprises per $cm^2$ of said end face 7.75 to 62 passages, each passage having a cross section of 0.5 to 9 $mm^2$, and wherein the porous walls that separate the passages have a thickness of about 0.3 to 1.5 mm.

9. A monolithic structure according to claim 1, wherein said passages are alternately open on one end face and plugged on the other end.

10. A monolithic structure according to claim 1, wherein said at least one bonding ceramic phase comprises at least one mixed oxide selected from the group consisting of alkylene aluminosilicates, alkylene-earth aluminosilicates, clays, bentonite and feldspars.

11. A process for the production of a monolithic structure according to claim 1, comprising a stage for mixing components that results in a homogeneous product in the form of a thickened paste, an extrusion stage of said product through a suitable die to form ceramic slabs in the form of a honeycomb monolith, a stage for drying monolithic slabs that are obtained, and a calcination stage that is carried out at a temperature that does not exceed 1650° C. and under an atmosphere that contains oxygen, whereby a stage for plugging every other passage at each end of the monolith is carried out at any stage of the process of production, after extrusion.

12. A process according to claim 11, wherein in the first stage, a mixture is mixed that comprises at least silicon carbide that has at least one particle size, a bonding phase that consists essentially of at least one simple oxide, and/or at least one mixed oxide, and at least one pore-forming agent, in a dry mixer, then at least one organic plasticizer and water are added.

13. A process according to claim 11, wherein to produce the desired porosity for the material that constitutes the monolithic structure of the invention, a group of silicon carbides comprising one or more silicon carbides having particles of sizes of 15 to 125 micrometers and one or more silicon carbides having particles of sizes less than 15 micrometers are used, and an addition of a proportion of about 5 to 30% by mass of at least one pore-forming agent that is selected based on the desired size of the pores is carried out.

14. A process according to claim 11, wherein the homogeneous product that is obtained in the first stage is cured at ambient temperature and under controlled hygrometry.

15. A process according to claim 11, wherein in the extrusion stage, the paste is passed, under a vacuum of 15 to 20 mm of mercury, into a screw extruder or piston extruder, thus producing crude ceramic slabs, in the form of monoliths.

16. A process according to claim 11, wherein in the drying stage, the crude ceramic slabs that are obtained are dried at a temperature from ambient temperature to 110° C. for an adequate time to bring the content of water that is not bonded chemically to less than 1% by mass.

17. A process according to claim 11, wherein in the calcination stage, the monolithic structure is brought to a temperature of 1100 to 1650° C., under an atmosphere that contains oxygen.

18. A process according to claim 11, wherein the calcination temperature is 1300 to 1650° C.

19. A process according to claim 11, wherein the calcination temperature is 1350 to 1650° C.

20. A process according to claim 11, wherein the plugging of every other passage on each of the end faces of the monolithic structure is carried out with a material that is similar to the constituent material of the monolith, but without pore-forming material, and that has a contraction upon firing that is smaller than that of said material.

21. A monolithic structure produced in accordance with the process of claim 11.

22. A monolithic structure produced in accordance with the process of claim 12.

23. A monolithic structure produced in accordance with the process of claim 13.

24. A monolithic structure produced in accordance with the process of claim 14.

25. A monolithic structure produced in accordance with the process of claim 15.

26. A monolithic structure produced in accordance with the process of claim 16.

27. A monolithic structure produced in accordance with the process of claim 17.

28. A monolithic structure produced in accordance with the process of claim 18.

29. A monolithic structure produced in accordance with the process of claim 19.

30. A monolithic structure produced in accordance with the process of claim 20.

31. A particle filter in an exhaust line of a diesel engine, said particle filter comprising a monolithic structure according to claim 1.

* * * * *